US006496321B1

(12) United States Patent
Tanaka

(10) Patent No.: US 6,496,321 B1
(45) Date of Patent: Dec. 17, 2002

(54) MAGNETIC RECORDING/REPRODUCING DEVICE USING COMPOSITE HEAD

(75) Inventor: Yoichiro Tanaka, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/429,637

(22) Filed: Oct. 29, 1999

Related U.S. Application Data

(62) Division of application No. 08/865,184, filed on May 29, 1997, now Pat. No. 6,088,181.

(30) Foreign Application Priority Data

May 30, 1996 (JP) ................................. 8-136286

(51) Int. Cl.7 .............................................. G11B 5/596
(52) U.S. Cl. ................................................. 360/77.02
(58) Field of Search ......................... 360/324.1, 324.11, 360/324.12, 313, 66, 75, 77.02, 55, 67

(56) References Cited

U.S. PATENT DOCUMENTS

| | | | | |
|---|---|---|---|---|
| 4,967,298 A | * | 10/1990 | Mowry | 360/313 X |
| 5,422,571 A | * | 6/1995 | Gurney et al. | 360/324.1 X |
| 5,483,402 A | * | 1/1996 | Batra | 360/313 X |
| 5,493,467 A | * | 2/1996 | Cain et al. | 360/324.1 X |
| 5,546,253 A | * | 8/1996 | Che | 360/324.1 X |
| 5,615,063 A | * | 3/1997 | Kuroki et al. | 360/66 |
| 5,719,729 A | | 2/1998 | Koyama et al. | 360/113 |
| 5,793,550 A | * | 8/1998 | Nepela et al. | 360/66 |

FOREIGN PATENT DOCUMENTS

| | | |
|---|---|---|
| JP | 6-20415 | 1/1994 |
| JP | 6-231553 | 8/1994 |
| JP | 6-259905 | 9/1994 |
| JP | 6-309822 | 11/1994 |
| JP | 7-153045 | 6/1995 |
| JP | 7-201148 | 8/1995 |

OTHER PUBLICATIONS

Ottesen, Hal H., "Future Servo Technologies for Hard Disk Drives", Journal of the Magnetics Society of Japan, vol. 18, Supplement, No. S1, pp. 31–36, 1994.

* cited by examiner

Primary Examiner—David Hudspeth
Assistant Examiner—K. Wong
(74) Attorney, Agent, or Firm—Finnegan, Henderson, Farabow, Garrett & Dunner, L.L.P.

(57) ABSTRACT

A magnetic recording/reproducing device comprises a recording head for magnetically recording a signal on a magnetic recording medium along a predetermined track, and a reproducing head member including a spin valve typed magnetoresistive element and bias magnetic applying means, associated with the spin valve typed magnetoresistive element, for applying a bias magnetic field to the spin valve typed magnetoresistive element, the reproducing head member for changing a sensitivity distribution in a track width direction based on a distance between the reproducing head and the recording head, and an angle difference between the direction of the reproducing head and the extending direction of the track.

20 Claims, 12 Drawing Sheets

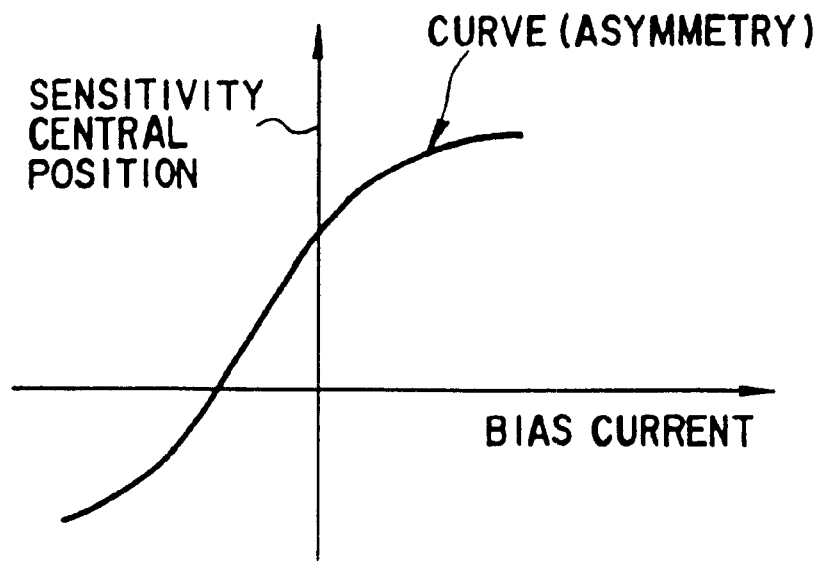
F I G. 4
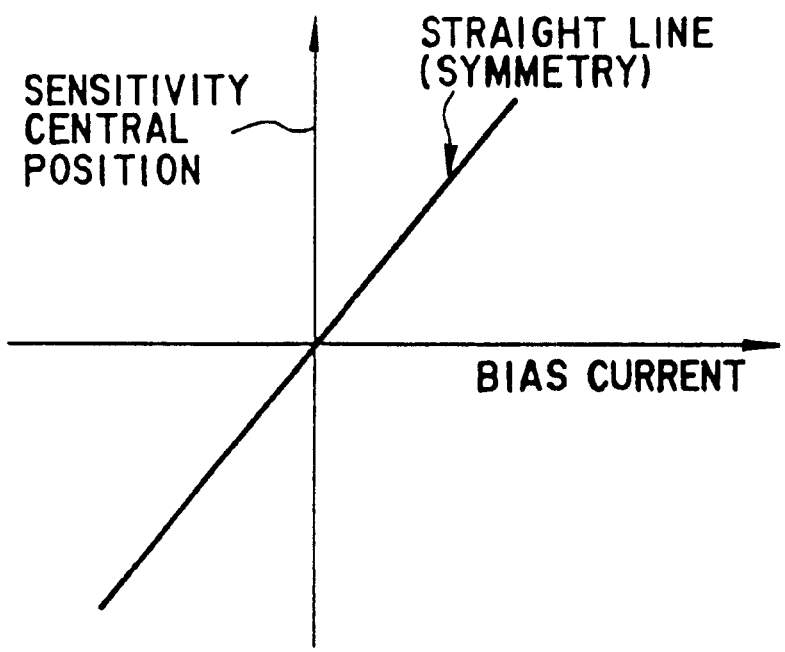
F I G. 5

θ : SKEW ANGLE

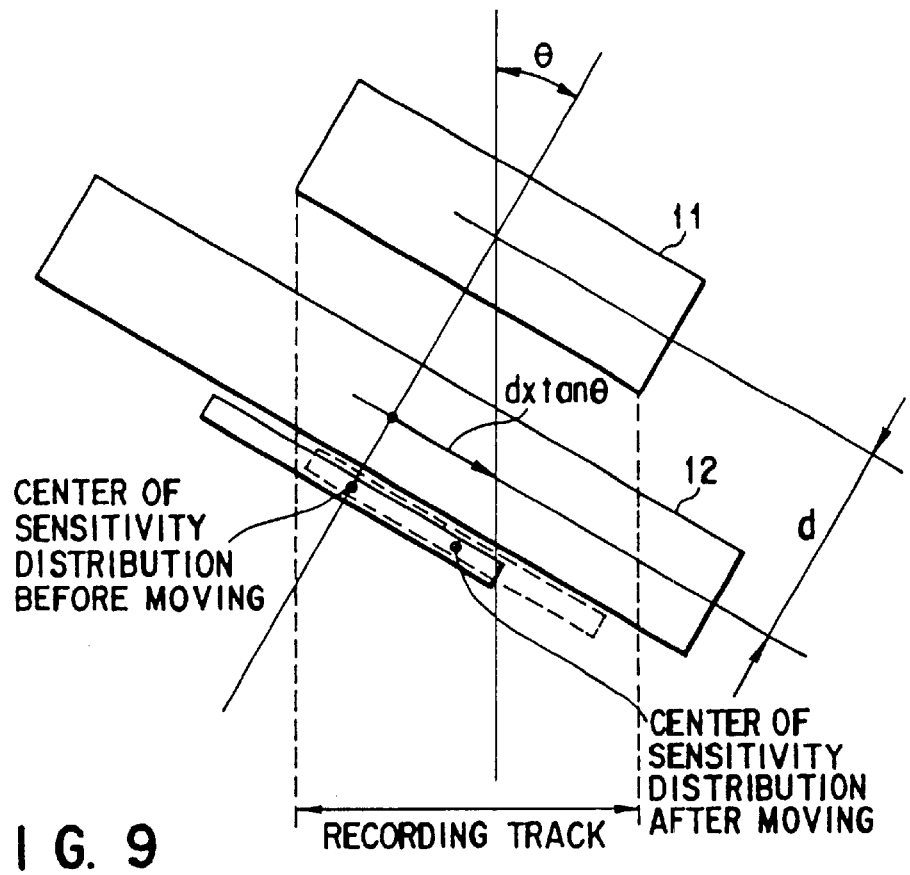
F I G. 9
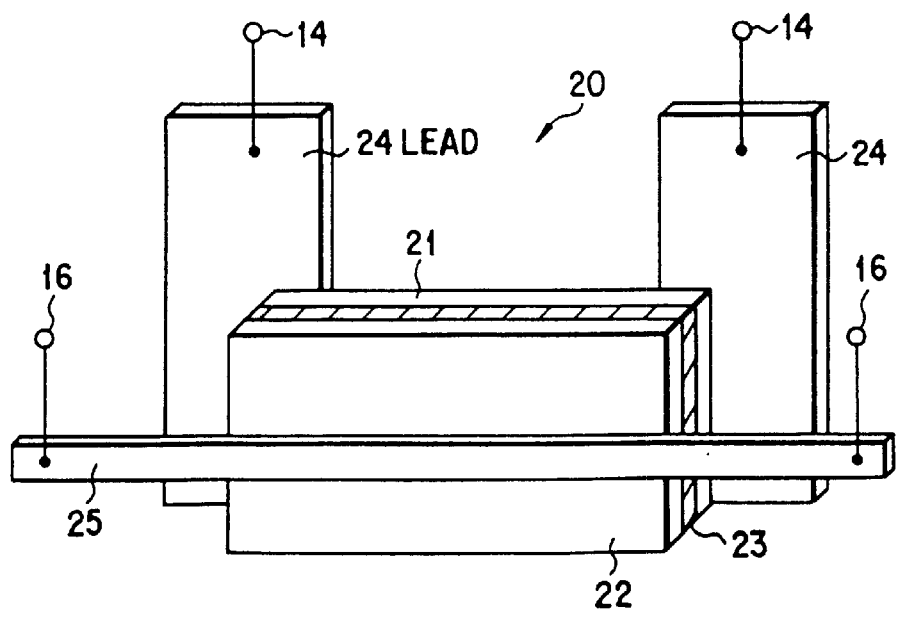
F I G. 10

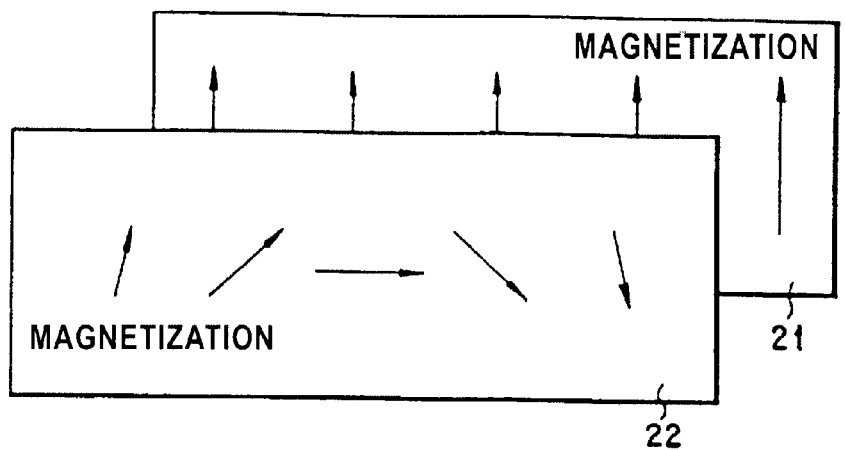
F I G. 11  TRACK WIDTH DIRECTION
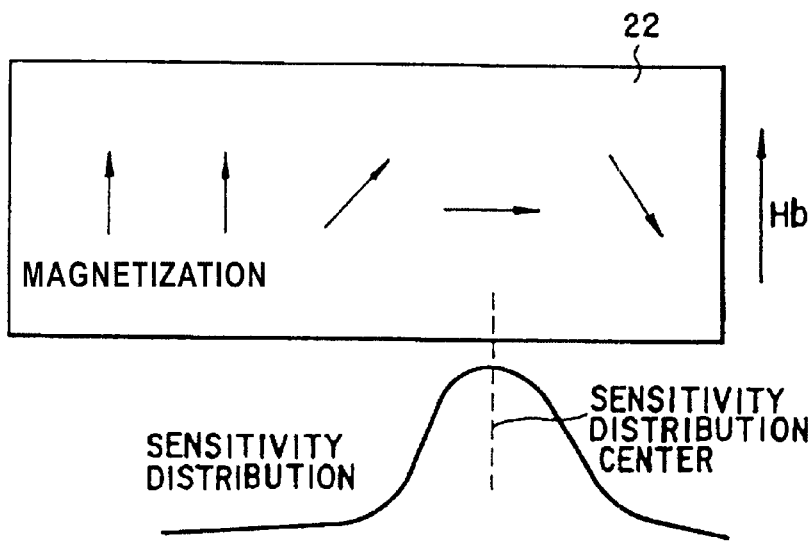
F I G. 12A
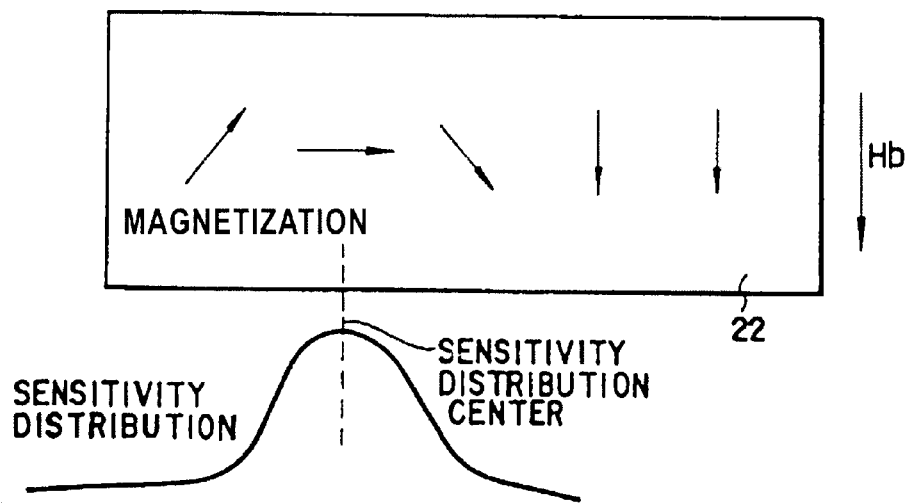
F I G. 12B

MAGNETIC RECORDING/REPRODUCING DEVICE USING COMPOSITE HEAD

This is a division of application Ser. No. 08/865,184, filed May 29, 1997, now U.S. Pat. No. 6,088,181, which is incorporated herein by reference.

BACKGROUND OF THE INVENTION

The present invention relates to a magnetic recording/reproducing device such as a hard disk device and particularly to a magnetic recording/reproducing device using a composite head.

A magnetic recording/reproducing device such as a hard disk device is frequently used as an outer storage device having a large, which is capable of accessing at random. In recent years, high recording density for enlarging storage capacity has been greatly demanded, and the study and development have been made in various angles to meet the demand.

Generally, in the hard disk device, a plurality of magnetic disks, each which is formed on a non-magnetic substrate to have a magnetic layer, are stacked on one rotation spindle. A head for recording/reproducing is attached to an arm to be opposite to each disk surface. The arm is moved to a radial direction of the disk so that the head is positioned. In other words, a seek operation is executed. At a signal recording/reproducing time, the head slightly floats, and is placed to access to a predetermined position of the disk surface in such a state without directly contacting the disk surface rotating at high speed. Then, a signal is recorded onto a concentric track on the disk surface by the head, or the recorded signal is reproduced.

In order to meet the demand of high recording density for enlarging storage capacity, various trials have been made so far. For example, a linear recording density of the disk, that is, recording density in the length direction of the track is increased. Or, a track width is narrowed to increase the track density, thereby improving recording density. In recent years, for further improving the recording density, there has been enthusiastically made the study and development of a contact recording in which the head is floated extremely lower or the head is brought in substantially contact with a recording medium.

On the other hand, to improve sensitivity of a signal reproduction, an active typed head, e.g., an MR head using magnetoresistive effect, has been developed. The MR head is a head, which converts a magnetic flux sent from the recording medium to an electrical signal by use of a property in which an electrical resistance of a soft magnetic member such as permalloy is changed by an outer magnetic field. The MR head converts the change of the electrical resistance of an MR element formed of the soft magnetic member to a voltage change. Due to this, the sensitivity of the signal reproduction of the head is proportional to an amount of sense currents flowing to the MR element. As a result, even if a relative speed between the head and the medium is small, a large reproducing output can be obtained. Also, by use of the feature in which the reproducing output of the MR head is large, the track width can be narrowed to improve the track density.

The reproducing head, which is formed of the MR head, is frequently used to be combined with a recording head, which is formed of an inductive head, thereby forming a composite head. In this case, the reproducing head is combined with the recording head to be spaced from each other with a predetermined distance in the track direction. The composite head is mounted on a head slider. The composite head is moved in a radial direction of the disk by a rotary actuator through the head slider. Then, the positioning to a target track, that is, the seek operation is performed. At the seek operation time, a track shift occurs between the recording head and the reproducing head due to the space existing between the recording head and the reproducing head in the direction of the track. In this case, the track shift means that the relative position between the head and the track differs by depending on the recording head and the reproducing head.

The mechanism of the track shift will be explained with reference to FIGS. 1A and 1B. FIGS. 1A and 1B are views each schematically showing a state that the composite head moved by the rotary actuator is positioned at an inner peripheral track on the magnetic disk and an outer peripheral track. As shown in the figures, for moving the composite head by the rotary actuator, an angle difference between the direction of the head (azimuth direction) and the direction of the track, that is, skew angle, is changed by depending on the track radial direction where the head is positioned. In FIGS. 1A and 1B, a skew angle $\theta$ is negative at the inner side (small diameter), and positive at the outer side (large diameter). The change of the skew angle appears as the track shift between the recording track and the reproducing track at it is. The track shift is increased as the track pitch is narrowed, and this brings about an obstacle to a correct reproduction.

Moreover, if the track width is narrowed to obtain high track density, it is necessary to increase the accuracy of positioning of the recording head and the reproducing head in the track width direction. However, if the track is narrowed, the tolerance between the recording head and the reproducing head in the positioning is relatively increased in view of the accuracy of the manufacturing process. This brings about an obstacle to obtain high track density.

Moreover, there is proposed a two-stage (two-dimensional) control typed head driving mechanism in which the rotary actuator is used as a coarse actuator and a mechanical fine actuator is used as a minor actuator. By use of this head driving mechanism, the composite head is controlled such that the recording head is mounted on the track at the recording time and the reproducing head is mounted on the track at the reproducing time. Due to this, for frequently repeating the recording and reproducing operations, the whole composite head must be frequently driven. As a result, it takes time to center a predetermined recording head or a reproducing head on a target track correctly.

In a case where the space between the head and the medium is extremely small and both contact with each other, its contacting force is added to the micro-actuator as disturbance. As a result, the head driving mechanism cannot be sufficiently functioned, and the tracking cannot be controlled with high accuracy.

Thus, in the magnetic recording/reproducing device using the composite head, there is the problem of the track shift. Then, the track shift causes the reduction of the reproducing output. Moreover, the track shift hinders the track pitch from being narrowed. Also, the track shift hinders the track density from being highly increased.

BRIEF SUMMARY OF THE INVENTION

An object of the present invention is to provide a magnetic recording/reproducing device in which a track pitch can be narrowed, the high density of the track can be obtained, and a large reproducing output can be obtained.

The above object can be attained by the following magnetic recording/reproducing device:

Specifically, there is provided a magnetic recording/reproducing device comprising:

a recording head for magnetically recording a signal on a magnetic recording medium along a predetermined track;

a reproducing head, having a spin valve typed magnetoresistive element, for reproducing the signal recorded on the magnetic recording medium in which a sensitivity distribution in a track width direction is changed in accordance with an external control signal; and controlling means for supplying the external control signal to the reproducing head.

The above-mentioned object can be also attained by the following magnetic recording/reproducing device:

Specifically, there is provided a magnetic recording/reproducing device comprising:

a recording head for magnetically recording a signal on a magnetic recording medium along a predetermined track;

a reproducing head, having a spin valve typed magnetoresistive element, for reproducing the signal recorded on the magnetic recording medium; and a conductive member, magnetically associated with the magnetoresistive element, to which a current is supplied in accordance with time and positional behavior among the track, recording head, and reproducing head.

Moreover, the above-mentioned object can be attained by the following magnetic recording/reproducing device:

Specifically, there is provided a magnetic recording/reproducing device comprising:

a recording head for magnetically recording a signal on a magnetic recording medium along a predetermined track; and a reproducing head member including a spin valve typed magnetoresistive element and bias magnetic applying means, associated with the spin valve typed magnetoresistive element, for applying a bias magnetic field to the spin valve typed magnetoresistive element, the reproducing head member for changing a sensitivity distribution in a track width direction based on a distance between the reproducing head and the recording head, and an angle difference between the direction of the reproducing head and the extending direction of the track.

Furthermore, the above-mentioned object can be attained by the following magnetic recording/reproducing device:

Specifically, there is provided a magnetic recording/reproducing device comprising:

a recording head for magnetically recording a signal on a magnetic recording medium along a predetermined track; and a reproducing head including a spin valve typed magnetoresistive element and means for sending a current, for applying the bias magnetic field to the spin valve typed magnetoresistive element by a shunt bias effect, to the spin valve typed magnetoresistive element itself in which the current to be sent to the spin valve typed magnetoresistive element itself by the means is defined based on a distance between the reproducing head and the recording head, and an angle difference between the direction of the reproducing head and the extending direction of the track.

Thus, according to the present invention, a GMR head using the spin valve typed magnetoresistive element (GMR element) (to be specifically described later) is used as the reproducing head of the composite head. Then, the center of the sensitivity distribution of the GMR head is moved, so that a large reproducing; output can be obtained by use of the GMR head. Also, Moreover, even if the center of the sensitivity distribution is moved, the track pitch can be narrowed and the high density of the track can be obtained without largely generating the crosstalk between the tracks. The main feature of the present invention lies in the following point:

Specifically, the characteristic of the sensitivity of the GMR head is symmetrically shown. Then, even if the center of the sensitivity distribution is moved, the entire characteristic curve is moved without spreading the lower edge portion of the characteristic curve.

On the other hand, the sensitivity distribution of the reproducing head is controlled by the magnetic field applied to the spin valve typed magnetoresistive element. Thereby, as compared with the mechanical head drive mechanism, a servo zone, that is, a drive frequency band of the head can be greatly highly set. In other words, in the case of the conventional mechanical actuators such as the rotary actuator, the micro actuator, etc., the servo driving cannot be performed with a frequency exceeding 10 kHz. In contrast, in the system for magnetically moving the sensitivity distribution of the reproducing head according to the present invention, a driving object of the fine actuator function is the sensitivity distribution, which is a magnetic characteristic of the reproducing head itself. Therefore, unlike the mechanical actuator for driving the reproducing head itself, according to the present invention, since the driving object has no mass, the servo driving can be performed with a frequency higher by an order of magnitude than the case of using the mechanical actuator. As a result, the positioning control having extremely high response can be performed. Even in a case where the recording and reproducing are frequently repeated, it is possible to reduce a period of time, which is needed to center a predetermined recording head or reproducing head on a target track.

Moreover, if the sensitivity distribution of the reproducing head is magnetically moved, no unfavorable influence is exerted on the head driving even if disturbance caused by the mechanical contact between the head and the medium is added to the head. As a result, the head positioning control can be stably performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a view showing a relationship between a central position of sensitivity and a bias current;

FIG. 5 is a view showing a relationship between a central position of sensitivity and a bias current;

FIG. 9 is a view showing the direction of the movement of the sensitivity distribution of the reproducing head and the amount of the movement;

FIG. 10 is a perspective view showing the specific structure of a spin valve typed MR element using as a reproducing head and a bias magnetic field generating element according to the first embodiment of the present invention;

FIG. 11 is a view showing a magnetization distribution of a pin layer of FIG. 8 and that of a free layer;

FIGS. 12A and 12B are views each showing a change of the magnetization distribution of the free layer due to a applied magnetic field of FIG. 10;

DETAILED DESCRIPTION OF THE INVENTION

Prior to the explanation of the embodiments, the principle of the present invention will be explained.

As explained above, the track shift between the recording head and the reproducing head, which occurs at the seek operation time, is that the reproducing head is positioned at the suitable position on the track. The track shift causes the reduction of the reproducing output. Also, the track shift hinders the track pitch from being narrowed. Moreover, the track shift hinders the track density from being highly increased.

To solve the problem of the track shift, there is means for preventing the reduction of the reproducing output even if the reproducing head is not positioned at the suitable position on the track. Such means is disclosed in, for example, Japanese Patent Publication (KOKAI) No. 7-153045. As shown in FIG. 2A, the MR head, which is a high-sensitive typed head, is used as a reproducing head to move the center of a sensitivity distribution of the MR head by only an amount of shift SL as shown in the figure. Thereby, the sensitivity distribution of the reproducing head is positioned at the suitable position on the track as possible.

Figure 2:
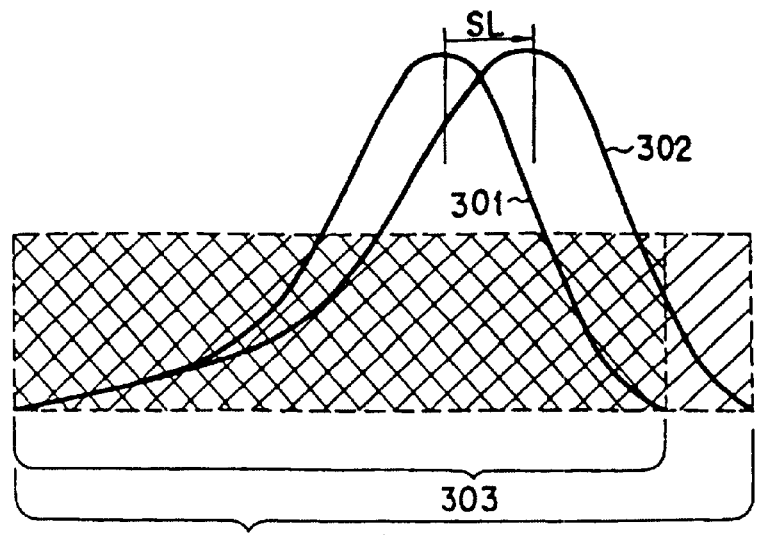
FIG. 2 is a view showing a characteristic of sensitivity by an MR head.

However, when the center of the sensitivity distribution of the MR head as a reproducing head is moved, the right lower edge portion of a characteristic curve is indeed shifted right, and the left lower edge portion is unchanged. In other words, when the center of the sensitivity distribution of the MR head is moved, the lower edge portion of the characteristic curve is spread. Generally, in the reproducing output of the MR head, a portion where a sensitivity value, which exceeds substantially ½ of the sensitivity peak of the characteristic curve, sharply changes mainly contributes to reproduce a signal. A portion where the resistance value is less than substantially ½ of the sensitivity peak of the characteristic curve at both sides does not mainly contribute to reproduce the signal. However, in the portion, crosstalk is generated. In FIG. 2, reference numeral 301 shows a sensitivity distribution characteristic curve of MR head before shifting, and reference numeral 302 shows a sensitivity distribution characteristic curve of MR head after shifting. Reference numeral 303 is a crosstalk area of the MR head before shifting, and reference numeral 302 is a crosstalk area of the MR head after shifting. The crosstalk area 302 is larger than the crosstalk area 301.

In such a phenomenon, even if the large reproducing output can be obtained by use of the MR head as a reproducing head, the crosstalk is largely generated between the tracks since the center of the sensitivity distribution is moved. This results in hindering the track pitch from being narrowed and the track density from being highly increased.

In order to solve the above-explained problem, according to the present invention, a GMR head, which is a spin valve typed magnetoresistive element (GMR element) to be specifically described later, is used as a reproducing of a composite head. Also, the center of the sensitivity distribution of the GMR head is moved, so that a large reproducing output can be obtained. Moreover, even if the center of the sensitivity distribution is moved, the track pitch can be narrowed and the high density of the track can be obtained without largely generating the crosstalk between the tracks. The main feature of the present invention lies in the following point:

Specifically, the characteristic of the sensitivity of the GMR head is symmetrically shown. Then, even if the center of the sensitivity distribution is moved, the entire characteristic curve is moved without spreading the lower edge portion of the characteristic curve.

Figure 3:
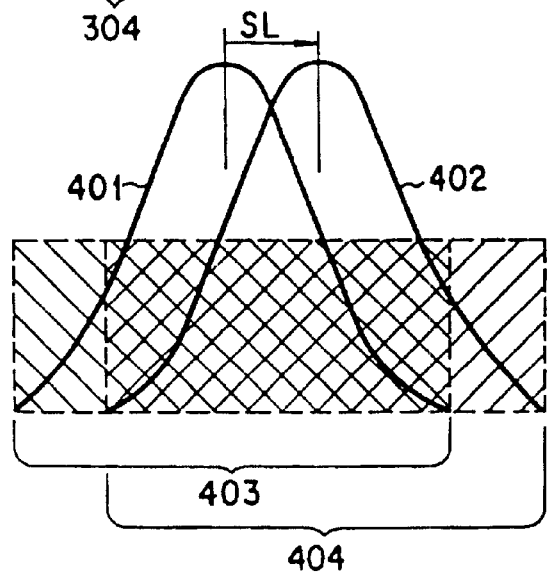
FIG. 3 is a view showing a characteristic of sensitivity by a GRM head.

In FIG. 3, reference numeral 401 shows a sensitivity distribution characteristic curve of spin valve type GMR head before shifting, and reference numeral 402 shows a sensitivity distribution characteristic curve of spin valve type GMR head after shifting. Reference numeral 403 is a crosstalk area of the spin valve type GMR head before shifting, and reference numeral 402 is a crosstalk area of the spin valve type GMR head after shifting. The crosstalk areas 401 and 402 has the same size, and differ from each other in only their position.

Conventionally, in the MR head, if the center of sensitivity moves, the shape of the sensitivity distribution and the width also change in principle. Therefore, if the center of sensitivity of the MR head is moved, the movement of MR head on the track is not symmetrical. In other words, if the distribution of sensitivity of MR head is moved in a direction of a track width by a bias magnetic field, the distribution of sensitivity is inevitably changed. Moreover, the movement of the central position of sensitivity is not linear against the bias magnetic field. Since this is largely different from the symmetrical movement of the reproducing head by the conventional mechanical actuator, it is difficult to improve the performance of the magnetic recording/reproducing device.

In contrast, according to the present invention, a GMR head having the structure shown in FIG. 10 is used. Therefore, a symmetrical sensitivity distribution as shown in FIG. 3 can be obtained, even if the center of the reproducing sensitivity is moved. Moreover, even if the center of the reproducing sensitivity is moved in the track width direction, the symmetrical sensitivity distribution can be also obtained. Since the magnetizing positions of both layers shown in FIG. 11 are symmetrical to each other, the center of the sensitivity distribution can be symmetrically moved when the bias magnetic field is applied. FIG. 5 shows a positional relationship between a bias current and the center of sensitivity. As compared with MR head shown in FIG. 4, in the case of the GMR head, the central position of the sensitivity distribution can be linearly and symmetrically moved. At this movement, the shape of the sensitivity distribution is unchanged as mentioned above.

The following will explain embodiments of the present invention in which the present invention is applied to a magnetic disk device using a disk-like magnetic recording medium with reference to the drawings.

Figure 6:
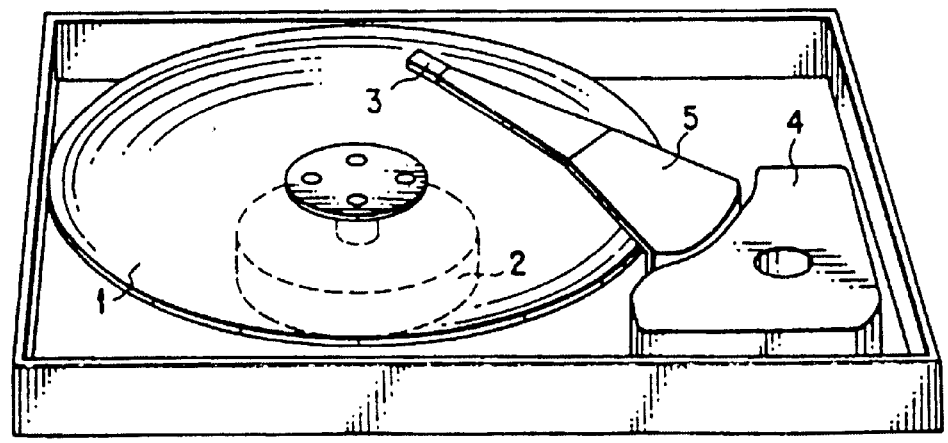
FIG. 6 is a perspective view showing an outline structure of a magnetic disk device of a first embodiment of the present invention.

FIG. 6 is a perspective view showing an outline structure of a magnetic disk device of a first embodiment of the present invention. A disk-like magnetic recording medium (hereinafter called magnetic disk) 1 is driven to be rotated by a spindle motor 2. A magnetic head unit 3 has a composite head to be mounted on a slider. The composite head is formed of a recording head and a reproducing head, which are combined with each other to be spaced from each other with a predetermined distance in a track direction. The magnetic head unit 3 is positioned at the top end of an arm actuator 5, which is driven in a radial direction of the magnetic disk 1 by a coarse actuator 4. The coarse actuator 4 is formed of a rotary actuator 4 using a VCM (voice coil motor). The composite head is positioned at a target track on the magnetic disk 1 by the coarse actuator 4 and a magnetic micro actuator to be described later so as to record/reproduce the signal.

Figure 7:
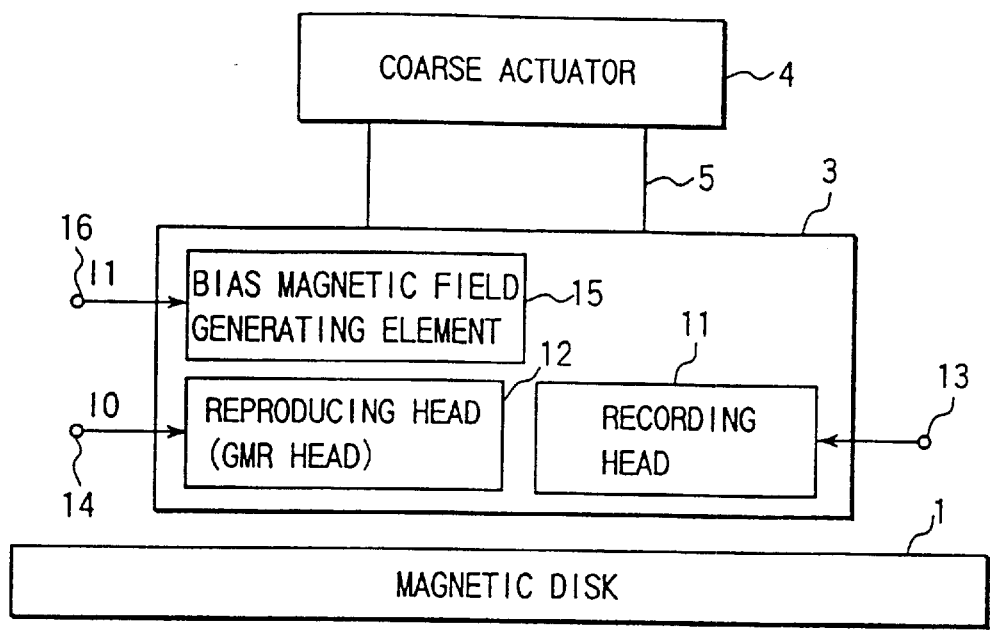
FIG. 7 is a view schematically showing the main structure of the magnetic disk device of the first embodiment of the present invention.

Next, FIG. 7 explains the magnetic head unit 3. FIG. 7 is a view schematically showing the basic structure of the magnetic head unit 3. On the magnetic head, a recording head 11 and a reproducing head 12, which constitute the composite head, are mounted. The recording head 11 is an induction type head, which records a data signal onto the magnetic disk 1 when a recording current is supplied from a recording amplifier (not shown) through a terminal 13 in accordance with the data signal. The reproducing head 12 is a great magnetic resistance effective head (GMR head), which reproduces the data signal recorded on the magnetic disk 1 or a servo signal, which is recorded in advance prior to recording the data signal. A sense current Io is supplied to the GMR element of the reproducing head 12 from a sense circuit (not shown) through a terminal 14. A change of the magnetic resistance of the GMR element, which is caused by the magnetic field based on the signal recorded on the magnetic disk 1, is extracted as a voltage change due to a sense current Io, that is, a voltage signal, from the terminal 14. Then, the voltage signal is supplied to a reproducing amplifier (not shown).

In the vicinity of the reproducing head 12, there is provided a bias magnetic field generating element 15, which applies a bias magnetic field to the GMA element so as to control the sensitivity distribution of the reproducing head 12. A bias current $I_1$ (external control signal) for controlling sensitivity distribution is supplied to the bias magnetic field generating element 15 from a current driver (not shown) through a terminal 16. The bias current $I_1$ is controlled in accordance with track position data showing the position of the track where the composite head is positioned (to be described later) or head position error data showing an error of the position of the composite head to the target track. By this control, the sensitivity distribution of the reproducing head 12, particularly, the sensitivity distribution in the radial direction of the magnetic disk 1 is controlled to optimize the relative positional relationship between the recording head 11 and the reproducing head 12.

Figures 8A, 8B:
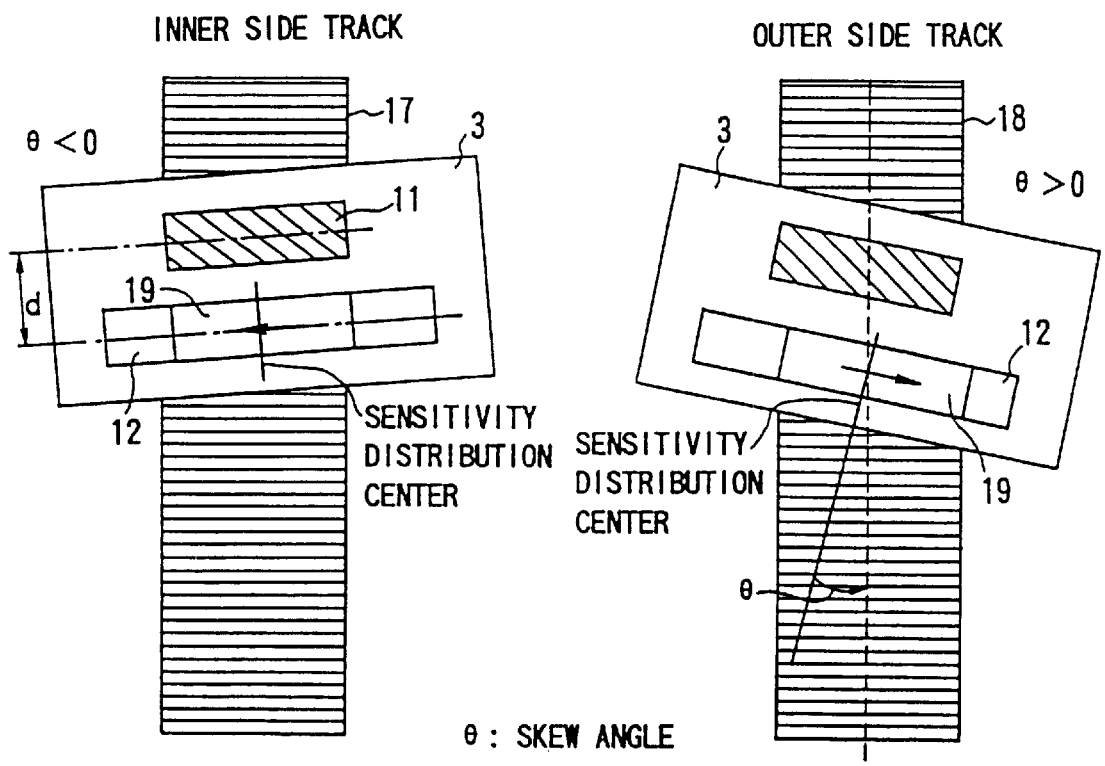
FIGS. 8A and 8B are views showing the relative positional change among the track at the track radial position, the recording head and the reproducing head, and the change of the distribution of the sensitivity of the reproducing head.

Each of FIGS. 8A and 8B shows an example showing the control of the relative positional relationship between the recording head 11 and the reproducing head 12. In other words, FIGS. 8A and 8B are views schematically showing a state of the relative positional relationship between the recording head 11 and the reproducing head 12 and that of the sensitivity distribution of the reproducing head 12 when the recording head 11 and the reproducing head 12 are positioned at the inner side track on the disk 1 and the outer side track.

Figures 1A, 1B:
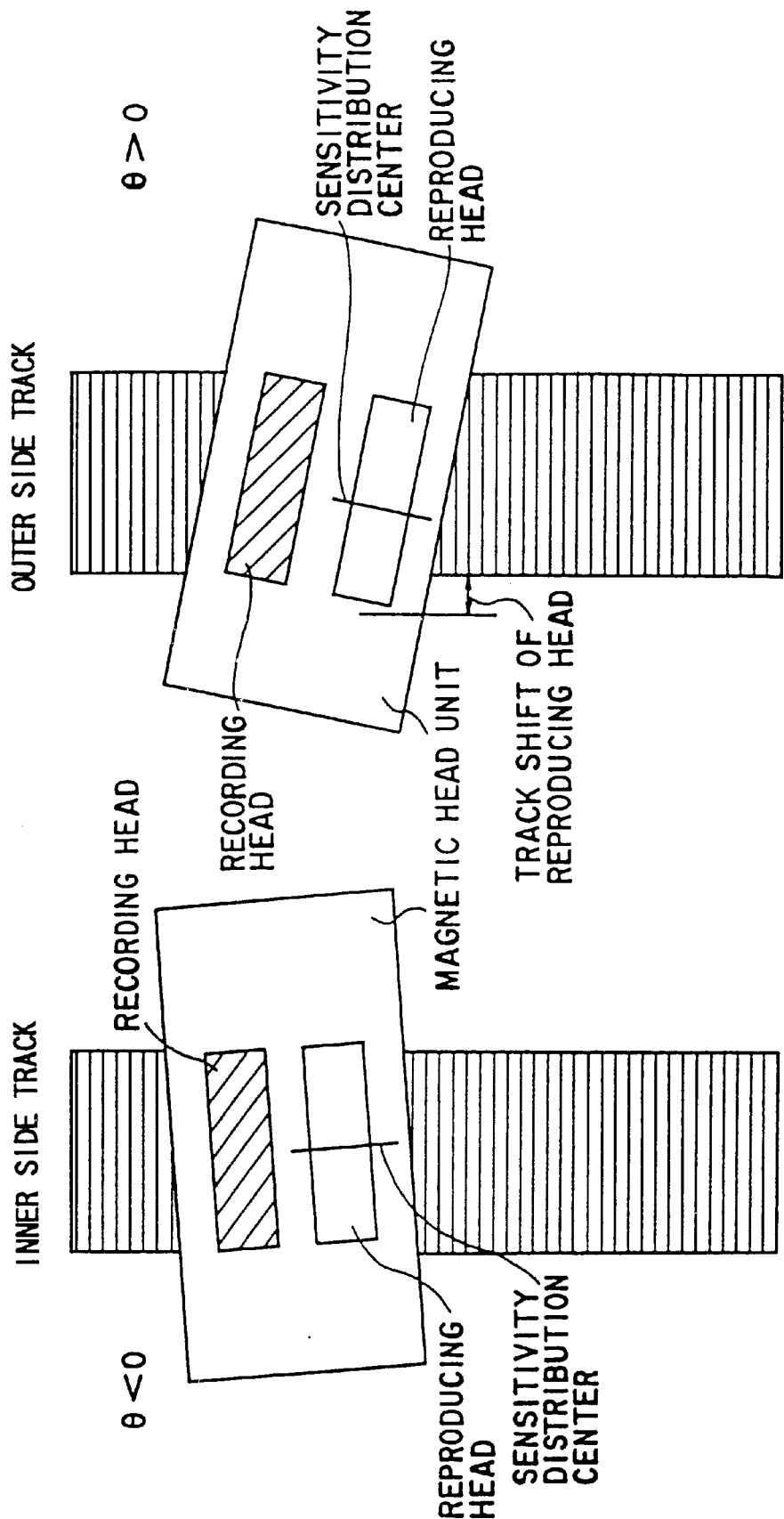
FIGS. 1A and 1B are views showing a relative positional change among a track at a track radial position, a recording head and a reproducing head to explain the problem of the prior art.

In a case where the rotary actuator is used as coarse actuator 4, as mentioned above, the angle difference θ between the direction of the head (azimuth direction) and the direction of the track, that is, skew angle, is changed by depending on the track radial direction where the head is positioned. In this embodiment, as shown in FIG. 8A, the skew angle θ becomes negative at an inner side track 17. Also, as shown in FIG. 8B, the skew angle θ becomes positive at an outer side track 18. As shown in FIGS. 1A and 1B, in the prior art, the change of the skew angle θ at the radial position directly appears as a track shift between the recording head and the reproducing head.

In contrast, according to the embodiment of the present invention, as shown in FIGS. 8A and 8B, a magnetizing section 19 of the reproducing head 12 is moved in a track width direction as shown in an arrow by the external control signal based on track position data showing the position of the track radial position on the magnetic disk 1 where the reproducing head 12 is positioned. By the movement of the magnetizing section 19, the track shift between the recording head 11 and the reproducing head 12 due to the skew angle θ can be prevented. The magnetizing section 19 is an area where the output of the reproducing head 12 varies against the magnetic field of the signal from the magnetic disk 1.

Thus, according to the above-explained embodiment of the present invention, the GMR head, which is the spin valve typed magnetoresistive element (GMR element), is used as the reproducing head of the composite head, and the center of the sensitivity distribution of the corresponding GMR head is used. Thereby, the large reproducing output can be obtained by use of the GMR head. Moreover, even if the center of the sensitivity distribution is moved, the track pitch can be narrowed and the high density of the track can be obtained without largely generating the crosstalk between the tracks. Furthermore, according to this embodiment, the characteristic of the sensitivity of the GMR head is symmetrically shown. Then, even if the center of the sensitivity distribution is moved, the entire characteristic curve is moved without spreading the lower edge portion of the characteristic curve.

More specifically, as shown in FIG. 9, it is assumed that the distance between the recording head 11 and the reproducing head 12 in the track direction is d. If the center of the track width direction of the magnetizing section 19 of the reproducing head 12 (center of the sensitivity distribution) is moved by substantially d×tan θ. Thereby, the track shift between the recording head 11 and the reproducing head 12 can be set to zero. In this case, the distance d is well known. The skew angle θ is defined by the length of the actuator arm 5, the position of the center of the rotation of the coarse actuator 4, and the track radial position where the head is positioned. A control section to be described later can correctly obtain the moving direction of the center of the sensitivity distribution of the reproducing head 12 at each track radial position and the amount of the movement based on the distance d and the skew angle θ Thus, even if the skew angle θ is varied by the track radial direction, the track shift between the recording head 11 and the reproducing head 12 can be prevented, and both heads 11 and 12 can be correctly mounted on the same track.

Next, the following will explain the specific examples of the reproducing head 12 and the bias magnetic field generating element 15 with reference to FIGS. 10 to 16.

A reproducing head shown in FIG. 10 is a GMR head using a spin valve typed MR element 20. The MR element 20 comprises a pin layer 21 serving as a first magnetic layer, and a free layer 22 serving as a second magnetic layer to sandwich a non-magnetic conductive layer 23 between these layers. In the pin layer 21, its magnetization is perpendicularly fixed to the surface of the magnetic disk 1. In the free layer 22, its magnetization is changed by an applied magnetic field. In this example, as shown in the figure, there is provided a pair of leads 24, which are connected to both ends of the MR element 20 to be brought in contact with both ends in the track width direction of the pin layer 21. The leads 24a and 24b are connected to the pair of terminals, respectively.

Such a spin valve typed MR element 20 is well known, and the pin layer 21 and the free layer 22 are formed of, e.g., a Co—Fe film. The non-magnetic conductive film 23 is formed of, e.g., a Cu film. In the prior art, the free layer 22 of the MR element 20 is oriented such that its magnetization is generated in parallel with the surface of the magnetic disk in the track width direction. Then, if the signal magnetic field is applied to the GMR element 20 from the medium, the direction of the magnetization of the free layer 22 is determined. An electric resistance of the GMR element 20, which is seen between the leads 24, is changed based on the relationship between the magnetizing direction of the free layer 22 and that of the pin layer 21. This is the giant magnetoresistive effect.

As mentioned above, in the prior art, the free layer 22 is uniformly oriented in the track width direction. In the embodiment of the present invention, as shown in FIG. 11, the free layer 22 is anisotropically oriented to be magnetized in a different direction in accordance with the position of the track width direction.

On the other hand, in the vicinity of the spin valve type MR element 20, there is provided a bias current line 25 along the track width direction to be made close to the free layer 22. The bias current line 25 is formed of a conductive film corresponding to the bias magnetic generating element 15 of FIG. 7. Both ends of the bias current line 25 are connected to the pair of terminals 16, respectively. The bias current line 25 is used to substantially uniformly apply bias magnetic field Hb, which is perpendicular to the track direction, to the MR element 20.

As a result, the direction of the bias magnetic field Hb to be applied to the MR element 20 and its amount can be changed by the direction of the current to flow to the bias current line 25 and its amount. Thereby, the sensitivity distribution in the track width direction of the GMR element 20, particularly, the position where sensitivity becomes maximum (center of the sensitivity distribution) can be changed. More specifically, in the case of FIG. 9, the center of the sensitivity distribution of GMR element 20 is the position where the magnetizing direction of the anisotropically oriented free layer 22 is perpendicular to the magnetizing direction of the pin layer 21. Then, in this state, if the bias magnetic field Hb is applied to the MR element 20, the magnetizing direction of each portion of the free layer 22 is changed by a vector composition with the bias magnetic field Hb. As a result, the center of the sensitivity distribution is changed in the track width direction.

Each of FIGS. 12A and 12B shows the change of the sensitivity distribution in the track width direction of the GMR element 20 when the direction of the current flowing to the bias current line 25 and its amount are changed so as to change the bias magnetic field Hb applied to the spin valve element. As shown in FIG. 12A, when the upward bias magnetic field Hb is applied to the element 20, the center of the sensitivity distribution is moved to the right side. As shown in FIG. 12B, when the downward bias magnetic field Hb is applied to the element 20, the center of the sensitivity distribution is moved to the left side. Thus, the direction of the bias current and its amount are changed, so that the center of the sensitivity distribution can be moved by an arbitrary direction of the track width direction and an arbitrary amount. Moreover, the sensitivity characteristic of the GMR head is symmetrical. Then, even if the center of the sensitivity distribution is moved, the whole characteristic curve is only moved without spreading the lower edge portion of the characteristic curve. Therefore, even if the center of the sensitivity distribution is moved, the crosstalk is not largely generated between the tracks.

Moreover, the anisotropical orientation having the magnetizing distribution as shown in FIG. 11 is provided to the free layer 22, so that the center of the sensitivity distribution can be moved as motioned above. Also, the sensitivity distribution is restricted to the narrow range, so that the shaper sensitivity distribution can be obtained. In the conventional MR head, the reproducing track width (reproduction width of the track width direction) was defined by the distance between the leads. However, according to the embodiment of the present invention, the magnetization and the anisotropical distribution are provided to the free layer 22, so that the reproducing track width, which is narrower than the distance between the leads, can be realized. As a result, the track can be more narrowed.

Figure 13:
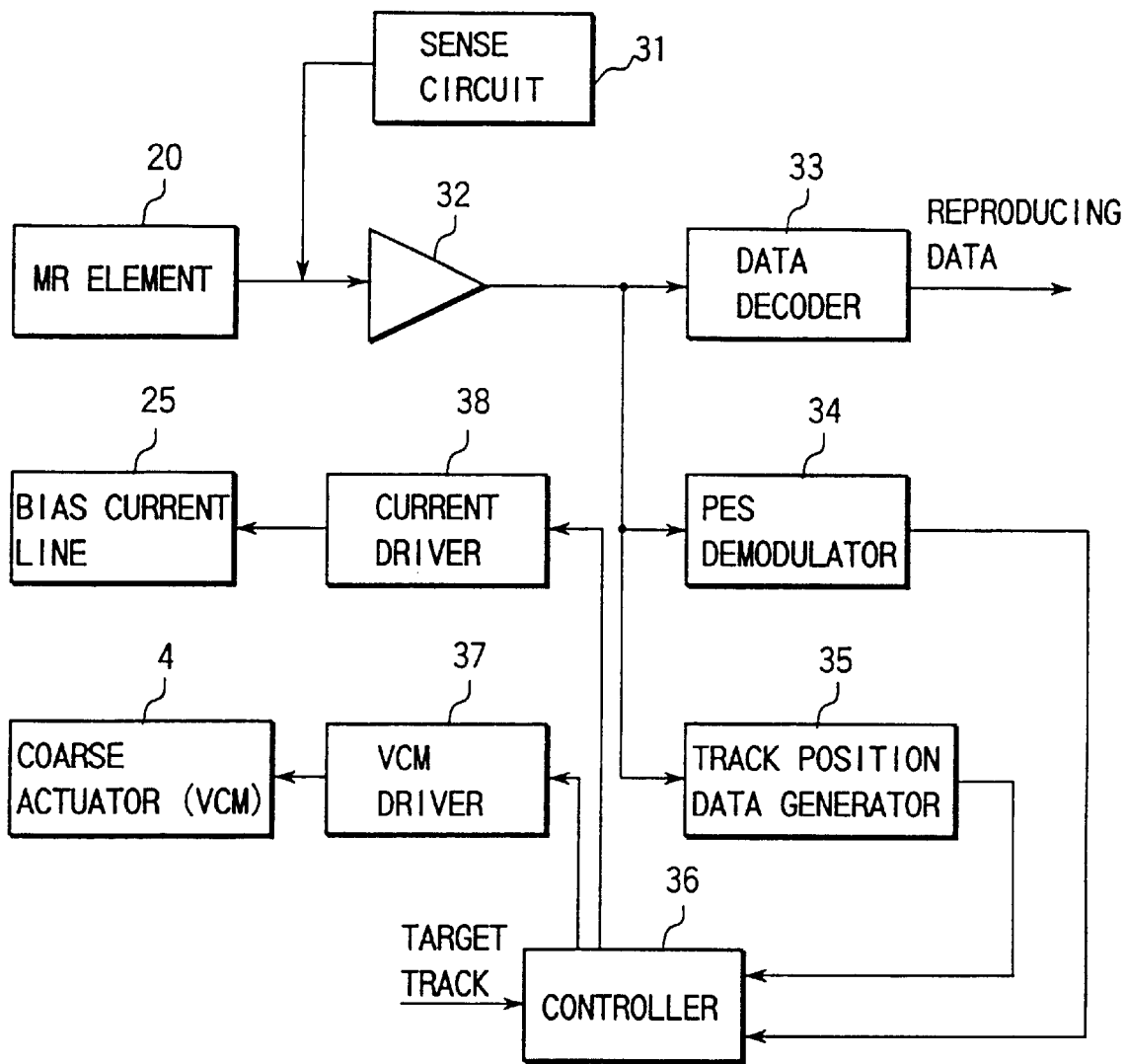
FIG. 13 is a block diagram showing the structure of a control system of the first embodiment of the present invention.

Next, the following will explain the structure of the control system of the embodiment of the present invention with reference to FIG. 13.

In FIG. 13, a fixed sense current is supplied to the GMR element 20 from a sense circuit 31. Then, a voltage signal, that is, a reproducing signal is output in accordance with the change of the magnetic resistance due to the magnetic field based on the signal recorded on the magnetic disk 1. The reproducing signal is amplified by a reproducing amplifier 32 to be input to a data decoder 33, a PES (position error signal) demodulator 34, and a track position data generator 35. The data decoder 33 converts the reproducing signal to binary signal and decodes original data through the identification of corresponding 0, 1, data. The PES demodulator 34 outputs head position error data showing an error of the head position to the target position from servo data recorded on the magnetic disk 1 in advance. The track position data generator 35 outputs track position data showing the radial position of the track where the head is currently positioned from servo data.

Then, head position error data from the PES demodulator and track position data from the track position data generator 35 are input to a controller 36. The controller 36 controls a VCM (voice coil motor)driver 37 for driving the coarse actuator 4 and a current driver 38 for supplying a bias current to the bias current line 25. The following will explain the specific control process of the controller 36.

Figure 14:
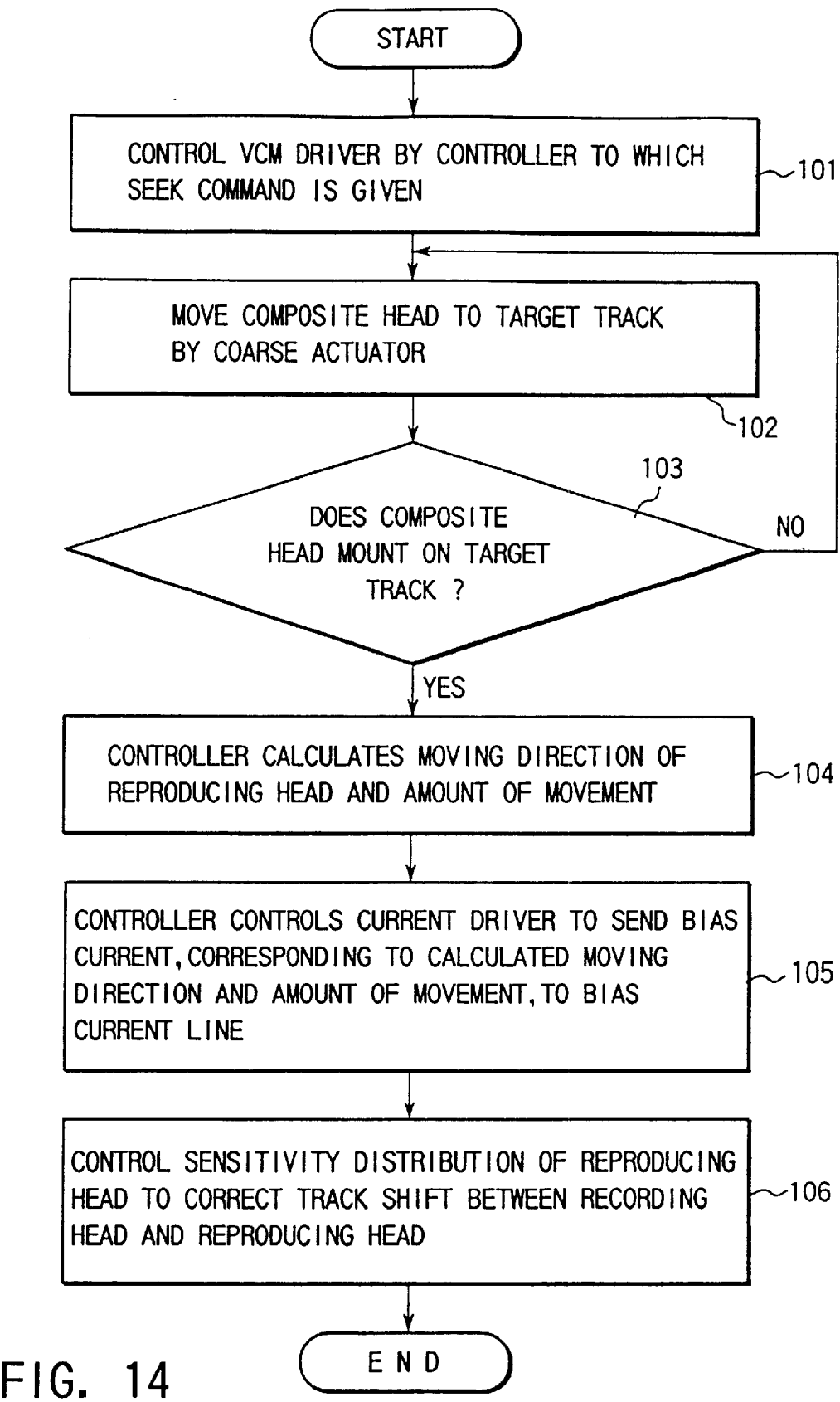
FIG. 14 is a flow chart showing an example of a control operation of the control system of the first embodiment of the present invention.

Specifically, a first control process will be explained with reference to FIG. 14. In step 101, if a seek order to the target track is given from an HDD controller (not shown), the controller 36 controls the VCM driver 37. By this control, in step 102, the coarse actuator 4 moves the composite head 1 to the target track on the magnetic disk 1. In step 103, the controller 36 confirms that the composite head is mounted on the target track on the magnetic disk 1 based on track position data generated by the track position data generator 35. In step 104, the controller 36 obtains the moving direction of the center of the sensitivity distribution of the reproducing head 12 and its amount of movement from the radial position of the target track by the calculation. In step 103, if the controller 36 does not confirm that the composite head is mounted on the target track on the magnetic disk 1, the operation goes back to step 102. Next, in step 105, the controller 36 controls the current driver 38 such that a bias current, which corresponds to the moving direction and the amount of movement, flows to the bias current line 25. Thereby, in step 106, the controller 36 controls the sensitivity distribution of the reproducing head to correct the track shift between the recording head and the reproducing head.

Figure 15:
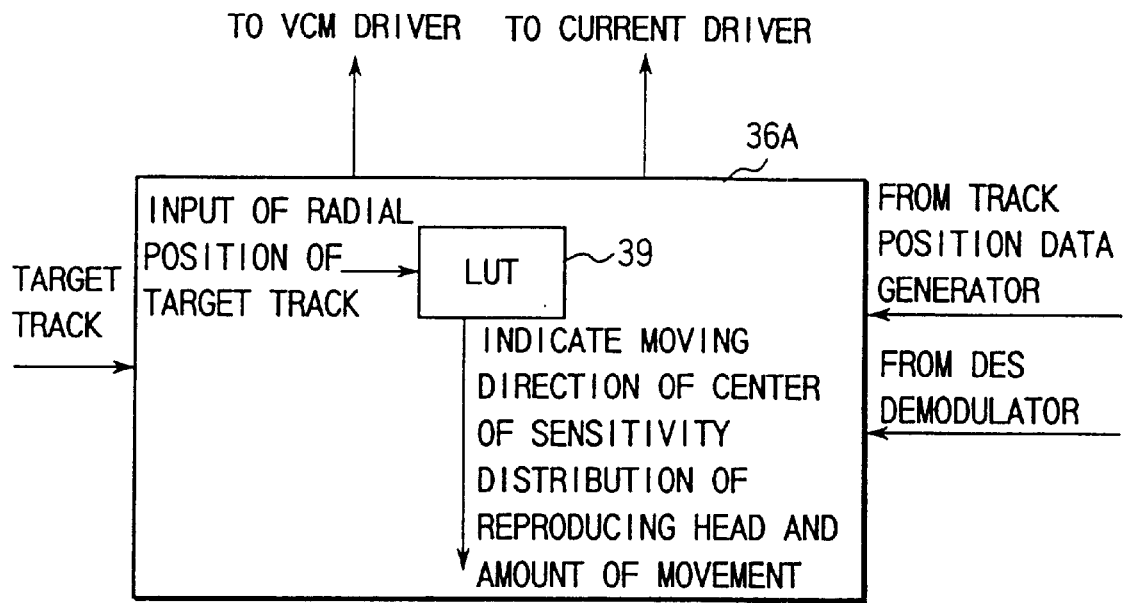
FIG. 15 is a view showing a control section having an LUT of the first embodiment of the presented invention.

In step 104, the moving direction of the center of the sensitivity distribution of the reproducing head 12 and its amount of movement were obtained by the calculation. In place of the calculation, as shown in FIG. 15, a look-up table (LUT) 39 is built in a controller 36A. Then, the moving direction of the center of the sensitivity distribution of the reproducing head 12 and its amount of movement can be presented from the radial position of the target track by the look-up table 39. In this case, the look-up table 39 stores, in advance, the moving direction of the center of the sensitivity distribution of the reproducing head 12 and its amount of movement from the radial position of the target track, which correspond to a plurality of radial positions of the target track.

Figure 16:
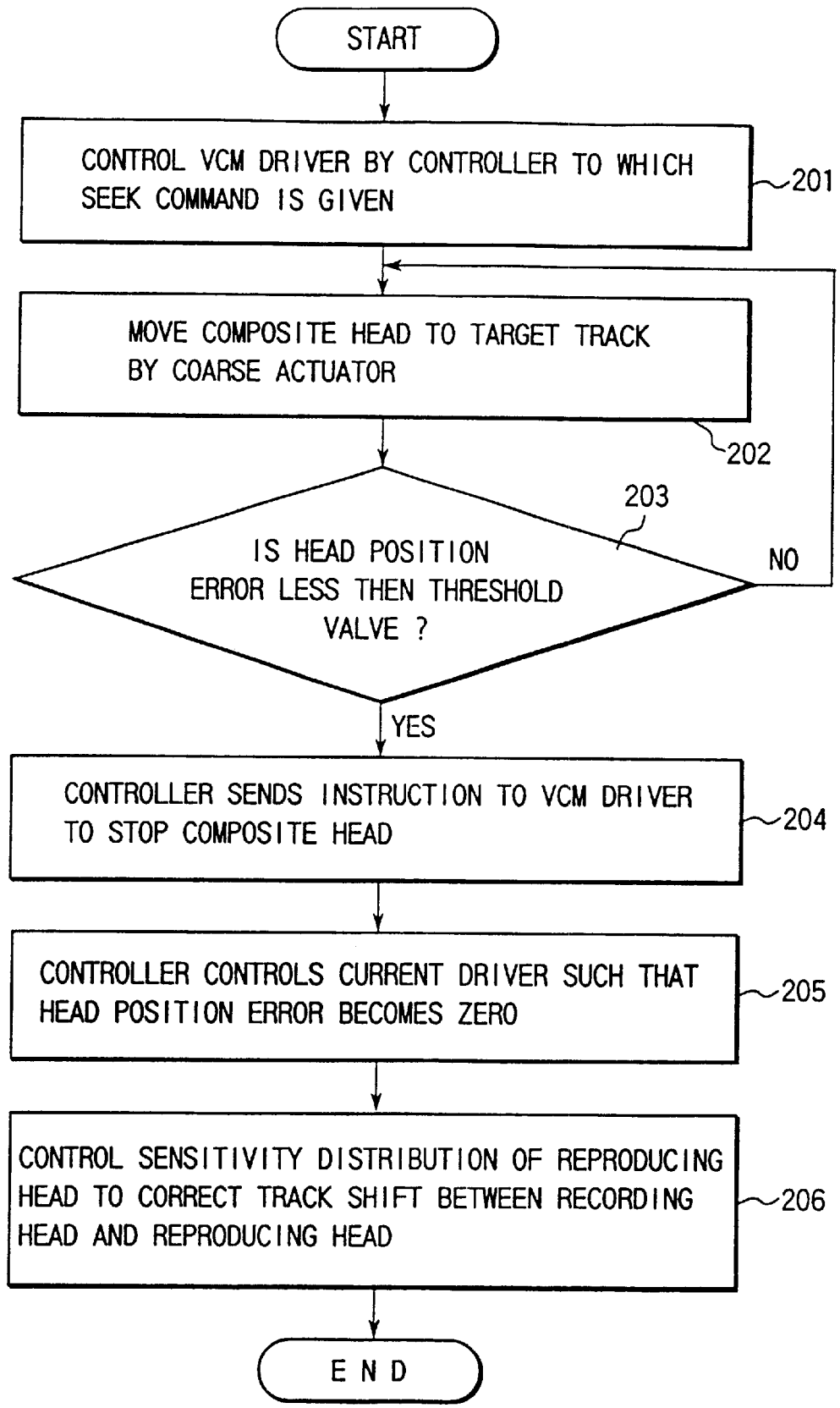
FIG. 16 is a flow chart showing the other example of a control operation of the control system of the first embodiment of the present invention.

Next, a second control process will be explained with reference to FIG. 16.

Specifically, steps 201, 202, and 206 of the second control process are the same as steps 101, 102, and 106 of the first control process. Specifically, if the seek order to the target track is given from the HDD controller (not shown), the controller 36 controls the VCM driver 37. By this control, the coarse actuator 4 moves the composite head 1 to the target track on the magnetic disk 1.

Steps 203 to 205 of the second control step are different from steps 103 to 105 of the first control step. Specifically, in step 203, the controller 36 checks the distance between the track position where the composite head is positioned and the target position, that is, the position error of the composite head based on head position error data from the PES demodulator 34. In step 204, if the head position error is less than a certain threshold value, the controller 36 sends instruction to the VCM driver 37 to stop the coarse actuator 4. In step 205, the controller 36 stops the composite head at the position, and controls the current driver 38 such that the head position error becomes zero so as to control the bias current flowing to the bias current line 25.

By the first and second control processes, the track shift between the recording head 11 and the reproducing head 12, which is caused by the skew angle θ, is corrected, so that data can be correctly reproduced.

Figure 17:
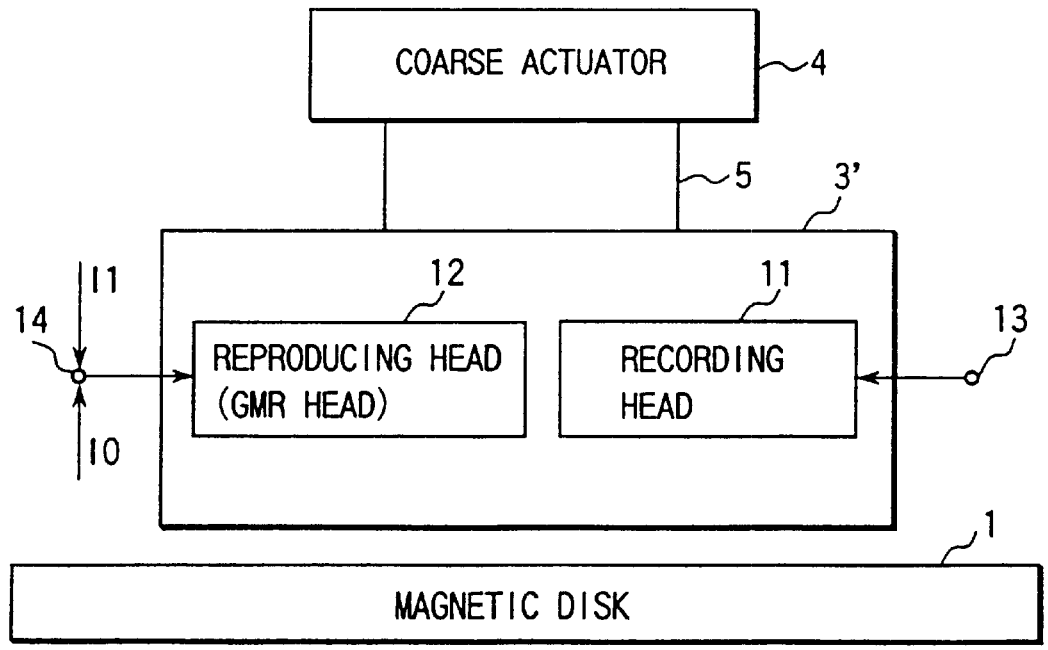
FIG. 17 is a perspective view showing the schematic structure of the magnetic disk device of a second embodiment of the present invention.
Figure 18:
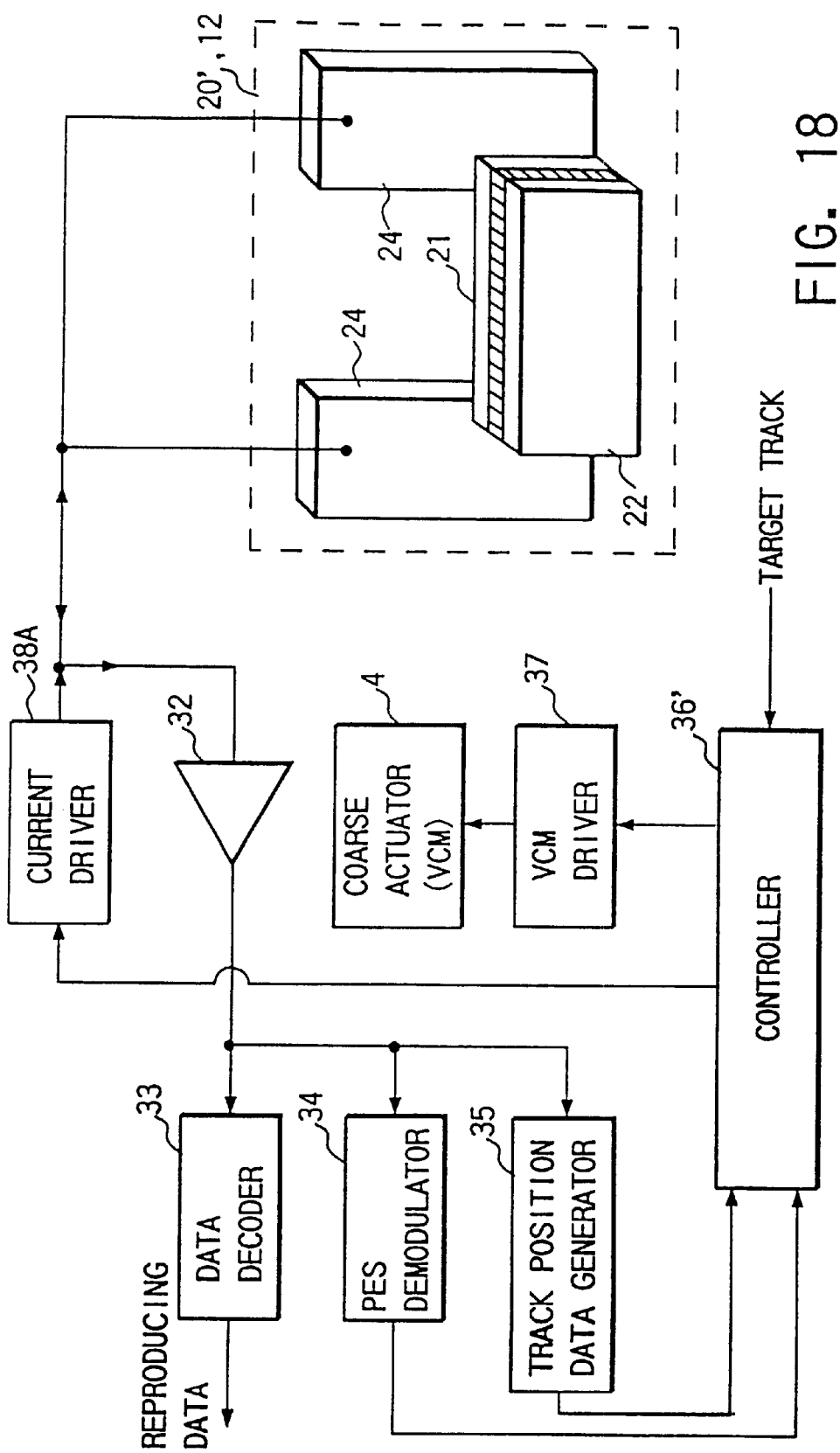
FIG. 18 is a view showing a control system and a magnetic head unit of the second embodiment of the present invention.

In the above-explained embodiment, the bias current line 25 was used as the bias magnetic field generating element 15 for applying the bias magnetic field to the GMR element 20. In place of the bias current line 25, by use of a current flowing to the GMR element 20 itself, the same bias magnetic field can be applied by a shunt bias effect. The structure of this third embodiment are shown in FIGS. 17 and 18. In FIGS. 17 and 18, the same reference numerals as FIGS. 7, 10, and 13 are added to the portions common to FIGS. 7, 10, and 13.

As shown in FIG. 17, the recording head 11 and the reproducing head 12, which are used as a composite head, are mounted on a magnetic head unit 3' of this embodiment. The bias magnetic generating element 15 shown in FIG. 7 is not provided. As shown in FIG. 18, since no bias magnetic field generating element 15 is provided, the bias current line 25, and the current driver 38 are omitted, and a current driver 38A is newly provided. Under the control of a controller 36', the current driver 38A has the function of the sense circuit 31 of FIG. 13 and a function of flowing a current (bias current for controlling the sensitivity distribution), which applies the same bias magnetic field as the bias magnetic field generating element 15 to the MR element 20 by the shunt bias effect.

In the above-mentioned embodiment, the pin layer 21 of the GMR element 20 was uniformly magnetized in the track width direction and the free layer 22 is anisotropically oriented. However, conversely, even if the free layer 22 is uniformly oriented in the track width direction and the pin layer 21 is anisotropically oriented to obtain the distribution shown in FIG. 7, the same effect can be obtained. The third embodiment will be explained with reference to FIGS. 19A to 19C.

Figure 19A:
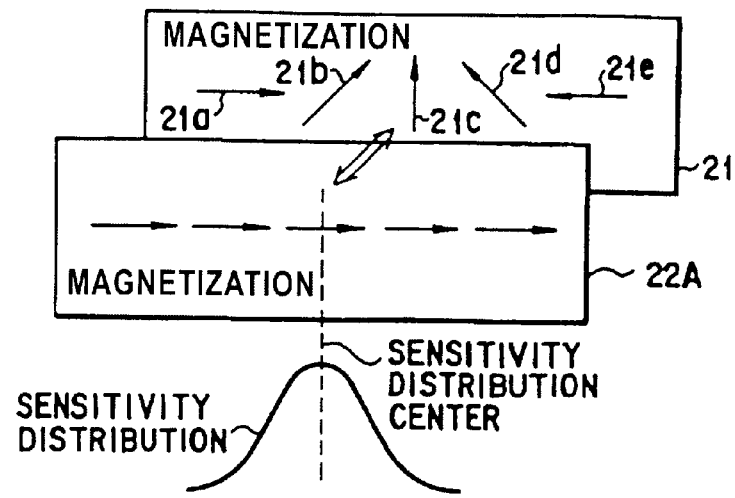
FIGS. 19A to 19C are views each showing a relationship between the magnetizing combination of the pin layer and the free layer and the center of the sensitivity distribution of a third embodiment of the present invention.
Figure 19B:
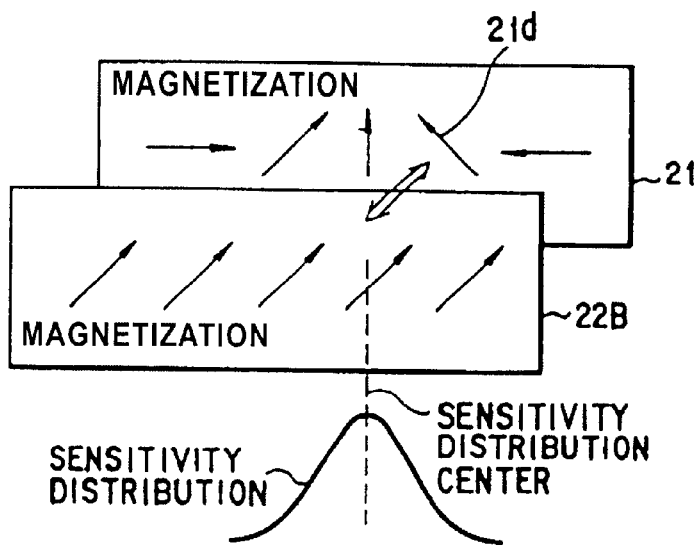
Figure 19C:
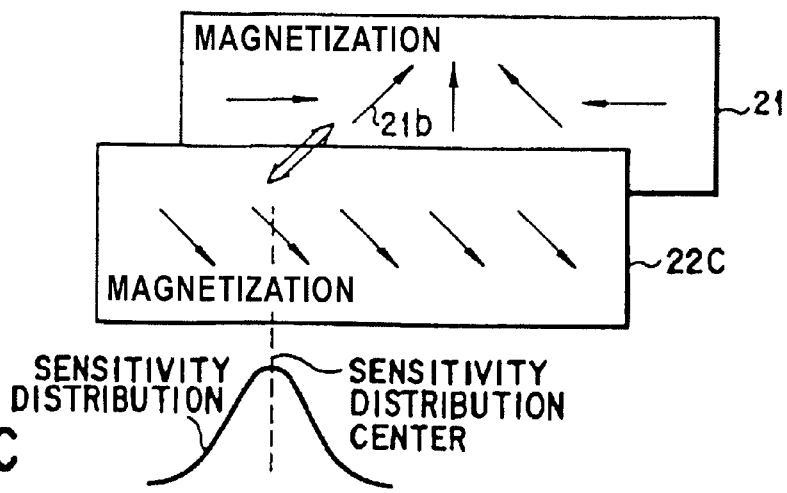

Specifically, in the GMR element 20, when the magnetization of the pin layer 21 and that of the free layer 22 are perpendicular to each other, the center of sensitivity of the GMR element 20 is fixed. By the application of the bias, as shown in FIG. 19A, it is assumed that the magnetization of the free layer 22 is oriented in the same horizontal direction against the pin layer 21 having a plurality of magnetizations 21a to 21e each having a different direction. As a result, the center of the sensitivity distribution is fixed to a position corresponding to the magnetization 21c of the figure. By the change of the bias, as shown in FIG. 19B, it is assumed that the magnetization of the free layer 22 is oriented in the same right upward direction against the pin layer 21 having the plurality of magnetizations 21a to 21e each having a different direction. As a result, the center of the sensitivity distribution is fixed to a position corresponding to the magnetization 21d of the figure. By the further change of the bias, as shown in FIG. 19C, it is assumed that the magnetization of the free layer 22 is arranged in the same right downward direction against the pin layer 21 having the plurality of magnetizations 21a to 21e each having a different direction. As a result, the center of the sensitivity distribution is fixed to a position corresponding to the magnetization 21b of the figure.

Thus, the center of the sensitivity distribution of the GMR element can be changed by changing the bias, so that the same technical advantage as the above-mentioned embodiments can be obtained.

Moreover, an angle formed by the magnetization of the free layer 21 and that of the pin layer 22 may have the same distribution as FIG. 7 in the track width direction. Therefore, in place of providing the anisotropical orientation to the free layer 21 and the pin layer 22, the same effect can be obtained even if the distribution is provided to intensity of the bias magnetic field applied to the GMR element 20 and its direction.

Thus, as explained above, according to the present invention, there can be provided a magnetic recording/reproducing device in which the track pitch can be narrowed, the high density of the track can be obtained, and a large reproducing output can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spin valve type magnetoresistive head for reproducing a signal recorded on a track of a magnetic recording medium, the head comprising:

first and second magnetic layers; and a non-magnetic conductive layer sandwiched between the first and second magnetic layers, wherein the first magnetic layer is magnetized uniformly and the second magnetic layer is magnetized nonuniformly such that a magnetization direction varies depending on a position along a track width direction so that a sensitivity of the reproducing head is maximum at a predetermined position along the track width direction.

2. The head according to claim 1, wherein said first magnetic layer is magnetized uniformly in a direction perpendicular to a surface of the recording medium and said second magnetic layer is nonuniformly magnetized such that a sensitivity of the reproducing head is maximum at a central position along the track width direction.

3. The head according to claim 1, wherein said first magnetic layer is magnetized uniformly in a direction parallel to a surface of the recording medium and said second magnetic layer is nonuniformly magnetized such that a sensitivity of the reproducing head is maximum at a central position along the track width direction.

4. A composite head device comprising:

the magnetoresistive head according to claim 1; and a recording head.

5. A magnetic reproducing device for reproducing a signal recorded on a track of a magnetic recording medium, comprising:

a spin valve type magnetoresistive head comprising:
      first and second magnetic layers; and
      a non-magnetic conductive layer sandwiched between the first and second magnetic layers, wherein the first magnetic layer is magnetized uniformly and the second magnetic layer is magnetized nonuniformly such that a magnetization direction varies depending on a position along a track width direction so that a sensitivity of the reproducing head is maximum at a predetermined a position along the track width direction; and a sensing current driver which supplies a sensing current to the head to generate a bias magnetic field for changing the magnetization direction of the second magnetic layer that shifts the predetermined position showing a maximum sensitivity along the track width direction.

6. The device according to claim 5, wherein said sensing current driver comprises means for controlling said sensing current in accordance with track position data showing a position of a radial direction of the magnetic recording medium of a track where said head is to be positioned.

7. The device according to claim 5, wherein said sensing current driver comprises means for controlling said sensing current in accordance with head position data showing a positional error of said head to a track where said head is to be positioned.

8. The device according to claim 5, wherein said sensing current driver applies the sensing current which is determined based on an angle difference between a direction of the head and an extending direction of the track by depending on a radial position of the track.

9. The device according to claim 5, wherein said first magnetic layer is magnetized uniformly in a direction perpendicular to a surface of the recording medium and said second magnetic layer is nonuniformly magnetized such that a sensitivity of the reproducing head is maximum at a central position along the track width direction.

10. The device according to claim 5, wherein said first magnetic layer is magnetized uniformly in a direction parallel to a surface of the recording medium and said second magnetic layer is nonuniformly magnetized such that a sensitivity of the reproducing head is maximum at a central position along the track width direction.

11. A magnetic reproducing device for reproducing a signal recorded on a track of a magnetic recording medium, comprising:

a spin valve type magnetoresistive head comprising:
      first and second magnetic layers; and
      a non-magnetic conductive layer sandwiched between the first and second magnetic layers, wherein the first magnetic layer is magnetized uniformly and the second magnetic layer is magnetized nonuniformly such that a magnetization direction varies depending on a position along a track width direction so that a sensitivity of the reproducing head is maximum at a predetermined position along the track width direction;

a bias current conductor; and a current driver which supplies a bias current through the bias current conductor to generate a bias magnetic field for changing the magnetization direction of the second magnetic layer that shifts the predetermined position showing a maximum sensitivity along the track width direction.

12. The device according to claim 11, wherein said sensing current driver comprises means for controlling said sensing current in accordance with track position data showing a position of a radial direction of the magnetic recording medium of a track where said head is to be positioned.

13. The device according to claim 11, wherein said sensing current driver comprises means for controlling said sensing current in accordance with head position data showing a positional error of said head to a track where said head is to be positioned.

14. The device according to claim 11, wherein said sensing current driver applies the sensing current which is determined based on an angle difference between a direction of the head and an extending direction of the track by depending on a radial position of the track.

15. The device according to claim 11, wherein said first magnetic layer is magnetized uniformly in a direction perpendicular to a surface of the recording medium and said second magnetic layer is nonuniformly magnetized such that a sensitivity of the reproducing head is maximum at a central position along the track width direction.

16. The device according to claim 11, wherein said first magnetic layer is magnetized uniformly in a direction parallel to a surface of the recording medium and said second magnetic layer is nonuniformly magnetized such that a sensitivity of the reproducing head is maximum at a central position along the track width direction.

17. A composite head device comprising:
   a spin valve type magnetoresistive head comprising:
      first and second magnetic layers; and
      a non-magnetic conductive layer sandwiched between the first and second magnetic layers, wherein the first magnetic layer is magnetized uniformly and the second magnetic layer is magnetized nonuniformly such that a magnetization direction varies depending on a position along a track width direction so that a sensitivity of the spin valve type magnetoresistive head is maximum at a predetermined position along the track width direction;
   and a recording head.

18. A composite head device comprising:
   a spin valve type magnetoresistive head comprising:
      first and second magnetic layers;
      a non-magnetic conductive layer sandwiched between the first and second magnetic layers, wherein the first magnetic layer is magnetized uniformly and the second magnetic layer is magnetized nonuniformly such that a magnetization direction varies depending on a position along a track width direction so that a sensitivity of the spin valve type magnetoresistive head is maximum at a predetermined position along the track width direction; and
   a bias current conductor; and a recording head.

19. A spin value type magnetoresistive head for reproducing a signal recorded on a track of a magnetic recording medium, the head comprising:
   first and second magnetized layers; and
   a non-magnetic conductive layer sandwiched between the first and second magnetized layers, wherein a magnetization direction of the first magnetized layer is fixedly perpendicular to a surface of the magnetic recording medium and a magnetization direction of the second magnetized layer is changed in accordance with a position of a track width direction so that a position at which the magnetization directions of the first magnetized layer and the second magnetized layer are perpendicular to each other is changed.

20. A magnetic reproducing device for reproducing a signal recorded on a track of a magnetic recording medium, comprising:
   a spin valve type magnetoresistive head having:
   first and second magnetic layers; and
   a non-magnetic conductive layer sandwiched between the first and second magnetic layers, wherein the first magnetic layer has a fixed magnetizing direction and the second magnetic layer has an anisotropic magnetizing direction;
   a device configured to apply a magnetic field to change the magnetizing direction of the second magnetic layer for shifting a sensitivity distribution center of the spin valve type magnetoresistive head along the track width direction; and
   a controller configured to control the device in accordance with data showing a position of a track where the head is to be positioned.

* * * * *

UNITED STATES PATENT AND TRADEMARK OFFICE
CERTIFICATE OF CORRECTION

PATENT NO.   : 6,496,321 B1
DATED        : December 17, 2002
INVENTOR(S)  : Tanaka It is certified that error appears in the above-identified patent and that said Letters Patent is hereby corrected as shown below:

<u>Column 13,</u>
Line 66, change "predetermined a position" to -- predetermined position --.

<u>Column 16,</u>
Line 4, change "value" to -- valve --.

Signed and Sealed this

Fifteenth Day of April, 2003

JAMES E. ROGAN
*Director of the United States Patent and Trademark Office*